US008488951B2

(12) United States Patent
Kulkarni et al.

(10) Patent No.: US 8,488,951 B2
(45) Date of Patent: Jul. 16, 2013

(54) MULTIMEDIA FRAMEWORK TO PROVIDE ULTRA-LOW POWER MULTIMEDIA PLAYBACK

(75) Inventors: Mayuresh Kulkarni, Maharashtra (IN); Dhiraj Nadgouda, Maharashtra (IN)

(73) Assignee: Nvidia Corporation, Santa Clara, CA (US)

( * ) Notice: Subject to any disclaimer, the term of this patent is extended or adjusted under 35 U.S.C. 154(b) by 827 days.

(21) Appl. No.: 12/499,809

(22) Filed: Jul. 9, 2009

(65) Prior Publication Data
US 2011/0008012 A1      Jan. 13, 2011

(51) Int. Cl.
*H04N 5/93* (2006.01)
(52) U.S. Cl.
USPC .......................................................... 386/357
(58) Field of Classification Search
USPC .................................................. 386/353, 357
See application file for complete search history.

(56) References Cited

U.S. PATENT DOCUMENTS

| | | | | |
|---|---|---|---|---|
| 5,982,360 A * | 11/1999 | Wu et al. | ........................ | 345/535 |
| 6,452,644 B1 * | 9/2002 | Shimakawa et al. | .......... | 348/730 |
| 6,519,009 B1 * | 2/2003 | Hanaya et al. | ................. | 348/564 |
| 7,187,694 B1 * | 3/2007 | Liao | ............................... | 370/474 |
| 7,516,203 B2 * | 4/2009 | Watanabe et al. | ............. | 709/223 |
| 7,900,076 B2 * | 3/2011 | Maher et al. | ................... | 713/324 |
| 8,103,952 B2 * | 1/2012 | Hopp | ............................ | 715/234 |
| 8,165,644 B2 * | 4/2012 | Syed | ............................. | 455/574 |
| 2002/0037160 A1 * | 3/2002 | Locket et al. | ................. | 386/111 |
| 2004/0125807 A1 * | 7/2004 | Liu et al. | ................... | 370/395.32 |
| 2005/0204179 A1 * | 9/2005 | Watts et al. | ................... | 713/322 |
| 2006/0136764 A1 * | 6/2006 | Munguia | ....................... | 713/322 |
| 2007/0121953 A1 * | 5/2007 | Wei | ................................. | 381/22 |
| 2008/0059823 A1 * | 3/2008 | Balatsos et al. | ............... | 713/323 |
| 2009/0021649 A1 * | 1/2009 | Lee et al. | ...................... | 348/730 |
| 2009/0060032 A1 * | 3/2009 | Schmit et al. | ............ | 375/240.01 |
| 2010/0132008 A1 * | 5/2010 | Takeuchi | ....................... | 725/141 |
| 2010/0146198 A1 * | 6/2010 | Morisetti et al. | .............. | 711/104 |
| 2010/0153758 A1 * | 6/2010 | Esliger et al. | ................. | 713/320 |

* cited by examiner

*Primary Examiner* — David Harvey
(74) *Attorney, Agent, or Firm* — Raj Abhyanker, P.C.

(57) ABSTRACT

A method of multimedia processing includes providing a multimedia processor operating at a frequency lower than that of a central processor of a multimedia processing system. A multimedia framework is implemented in the multimedia processing system. The multimedia framework is utilized to execute, on the multimedia processor, one or more of reading an input, transforming a data based on the reading of the input, and placing an output based on the transforming of the data on a rendering device. Power dissipated in the multimedia processing system is reduced by solely executing a requisite parsing on the central processor of the multimedia processing system.

12 Claims, 5 Drawing Sheets

PIN-LESS MULTIMEDIA FRAMEWORK 200

MULTI-MEDIA PLAYBACK SYSTEM 300

MULTIMEDIA FRAMEWORK TO PROVIDE ULTRA-LOW POWER MULTIMEDIA PLAYBACK

FIELD OF TECHNOLOGY

This disclosure relates generally to multimedia processing systems and, more particularly, to a method, apparatus, and a system to obtain an ultra-low power multimedia playback capability in multimedia players utilizing an appropriate pin-less multimedia framework implementation.

BACKGROUND

Multimedia frameworks simplify tasks related to multimedia handling over processing systems and processing system networks. Tasks may be simplified by easing multimedia capturing and playback, and multimedia streaming. Multimedia frameworks, such as DirectShow® for Windows®, can include modular multimedia components (e.g., filters in DirectShow® for Windows®). Specific interfaces may be provided by the typifying multimedia framework through the modular multimedia components. For example, a multimedia framework may identify roles for each component, and may give each component specific interfaces, thereby enabling the components to handle tasks and notify events.

To enable interfacing between components, member objects called pins may be provided. These pins, which may be data structures, are components that are aggregated within a component. In existing systems, every component communicates with every other component through pins thereof. Information regarding the correspondence between components and respective individual pins needs to be provided. Also, an architecture utilizing pins tends to create threads including worker threads corresponding to individual pins. As data flow occurs in worker threads, memory and resource consumption in a pin-based architecture are causes for concern.

SUMMARY

Disclosed are a method, an apparatus, and a system to provide ultra-low power multimedia playback in multimedia players utilizing an appropriate pin-less multimedia framework implementation.

In one aspect, a method of multimedia processing is disclosed. The method includes providing a multimedia processor operating at a frequency lower than that of a central processor of a multimedia processing system, implementing a multimedia framework in the multimedia processing system, utilizing the multimedia framework to execute, on the multimedia processor, one or more of reading an input, transforming a data based on the reading of the input, and placing an output based on the transforming of the data on a rendering device, and reducing power dissipated in the multimedia processing system by solely executing a requisite parsing on the central processor of the multimedia processing system.

In another aspect, a multimedia framework to provide multimedia playback on a multimedia framework is disclosed. The multimedia frame work includes a monolithic multimedia component and a component control unit layer. The monolithic multimedia component includes a specific interface provided by the multimedia framework that signifies roles identified by the multimedia framework for the monolithic multimedia component. The component control unit layer serves as a point of control of an application, and controls a data flow through the monolithic multimedia component. When the application queries the component control unit layer for the specific interface, the specific interface passes a pointer thereof that signifies a role required by the application matching a role identified by the multimedia framework for the monolithic multimedia component to the application to indicate the support of necessary interfaces providing communication between the application and the component control unit layer.

Commands from the application are passed to a tunnel of a multimedia stack interfaced with the monolithic multimedia component. The multimedia stack includes one or more of a first block to parse an input, one or more of a second block to transform a first block output data of the first block, and a third block to place an output from the one or more of the second block on a rendering device. The same monolithic multimedia component serves as one or more of a source component to read and to parse the input, one or more of a transform component to transform the output data of the source component, and a renderer to place the output of the one or more of the transform component on the rendering device. The application is unaware of the same monolithic multimedia component serving as one or more of the source component, one or more of the transform component, and the renderer.

In yet another aspect, a multimedia processing system is disclosed. The multimedia processing system includes a multimedia processor operating at a lower frequency, a central processor operating at a frequency higher than that of the multimedia processor, and a multimedia framework. The multimedia framework is utilized to execute, on the multimedia processor, one or more of reading an input, transforming a data based on the reading of the input, and placing an output based on the transforming of the data on a rendering device. Solely a requisite parsing is executed on the central processor.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, an apparatus, and a system to provide ultra-low power multimedia playback in multimedia players utilizing an appropriate pin-less multimedia framework implementation. Although the present embodiments have been described with reference to specific example embodiments, it will be evident that various modifications and changes may be made to these embodiments without departing from the broader spirit and scope of the various embodiments.

In general, example embodiments discussed below provide a multimedia framework for ultra-low power multimedia playback. In one or more embodiments, a method of multimedia processing in a multimedia processing system utilizing the implementation of the aforementioned multimedia framework may result in reduced power dissipation in the multimedia processing system. Examples of multimedia processing systems include, but are not limited to, mobile processors in portable multimedia players.

Various exemplary embodiments will now be described with reference to the accompanying figures.

Figure 1:
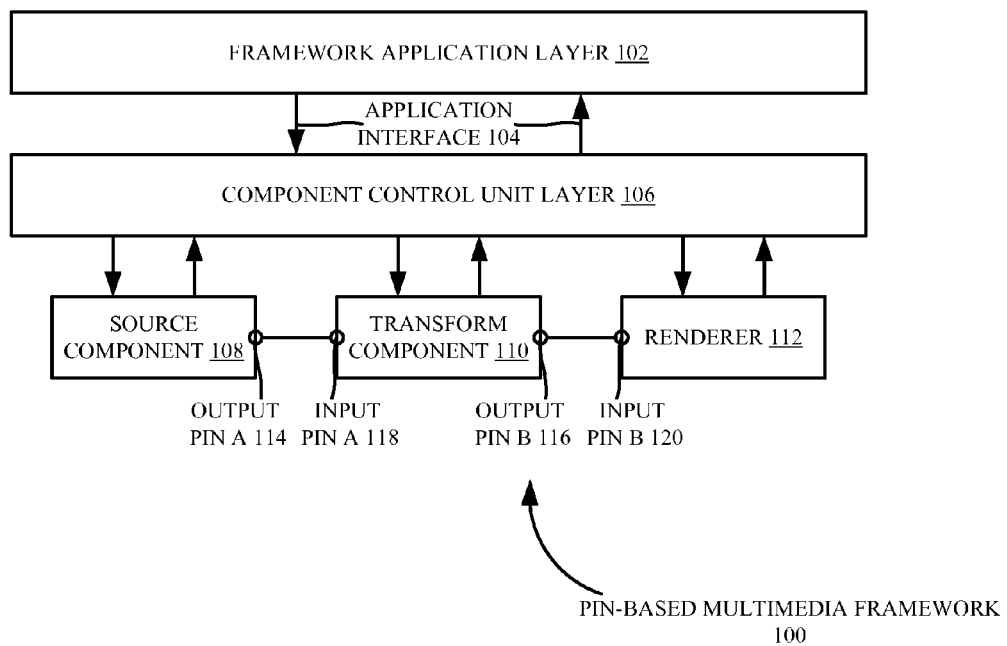
FIG. 1 a schematic view of a multimedia framework, exemplifying a pin-based architecture, in accordance with one or more embodiments.

FIG. 1 is a schematic view of a multimedia framework 100, exemplifying a pin-based architecture. Particularly, FIG. 1 illustrates a multimedia frame work 100 that includes a framework application layer 102, an application interface 104, a component control unit layer 106, a source component 108, an output pin A 114, an input pin A 118, a transform component 110, an output pin B 116, an input pin B 120, and a renderer 112. The multimedia framework 100 may be a multimedia layer providing multimedia capture, processing, and playback (e.g., DirectShow® for Windows®) from local or remote sources. The multimedia framework 100 may be above a foundation layer that facilitates access of hardware (e.g., sound card).

Referring to the exemplary multimedia framework 100 of FIG. 1, the framework application layer 102 may communicate with the component control unit layer 106 through the application interface 104. An application at the framework application layer 102 level may perform a required task by connecting the source component 108, transform component 110, and the renderer 112 together with the help of the component control unit layer 106. The application interface(s) 104 may, therefore, facilitate communication between the application and the component control unit layer 106 by including necessary interfaces required for the aforementioned communication. The component control unit layer 106 (e.g., Filter Graph Manager in DirectShow® for Windows®) may control arrangements of the source component 108, transform component 110, and the renderer 112, and may also control a dataflow therethrough. The components (108, 110, and 112) may include interfaces that signify roles thereof identified by the multimedia framework 100.

Dataflow may be enabled through pins (114, 116, 118, and 120) that serve as interfaces between the components (108, 110, and 112). The directionality of the pins (114, 116, 118, and 120) influences the order in which components are arranged and connected to one another. The source component 108 may read and parse from an input file, and may send a bit-stream to downstream components. Therefore, the source component 108 of FIG. 1 may have one output pin (Output Pin A 114) and no input pins. The transform component 110 may do custom processing on the bit-stream to send data downstream. The custom processing may include a parsing, a decoding or a requisite data operation. As there can exist a plurality of transform components, the transform component 110 of FIG. 1 may include upstream and downstream components therein. The transform component 110 is shown in FIG. 1 as having one input pin (Input Pin A 118) and one output pin (Output Pin B 116) for example purposes.

The renderer 112 may receive the processed output data of the transform process and place it on a rendering device. The rendering process may also include displaying a multimedia on screen, playing an audio file on a sound card, writing a data to a file etc. As the renderer 112 is at the end of a component chain, the renderer 112 may have one input pin (Input Pin B 120) and no output pins.

At a basic level, a component configuration may merely include a source component and a renderer. Such a configuration may merely be used for playing a multimedia file without processing.

Figure 2:
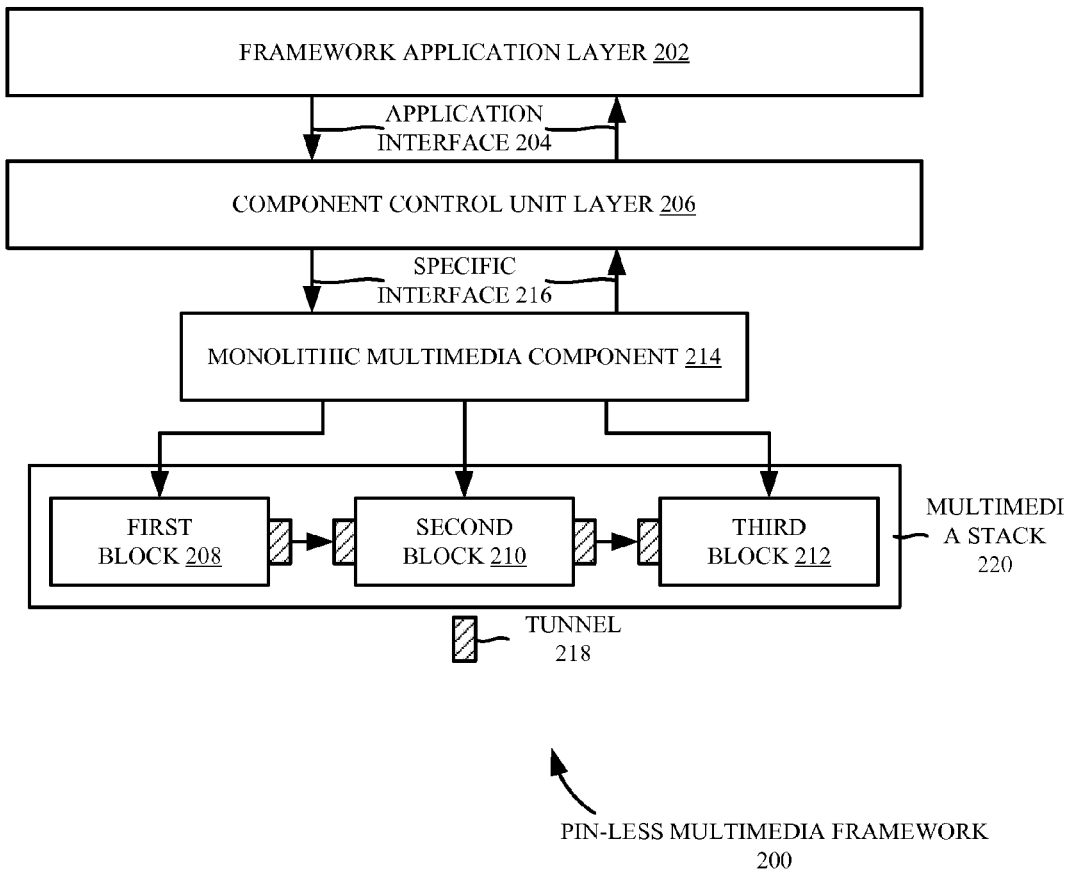
FIG. 2 is a schematic view of a pin-less multimedia framework architecture, in accordance with one or more embodiments.

FIG. 2 is a schematic view of a pin-less multimedia framework 200 architecture, in accordance with one or more embodiments. Particularly, FIG. 2 illustrates a multimedia framework 200 that includes a framework application layer 202, an application interface 204, a component control unit layer 206, a specific interface 216, a monolithic multimedia component 214, a first block 208, a second block 210, a third block 212, and a tunnel 218.

In one or more embodiments, an application at the framework application layer 202 level may perform a required task through the monolithic multimedia component 214 with the help of the component control unit layer 206. The application interface(s) 204 may, therefore, facilitate communication between the application and the component control unit layer 206 by including necessary interfaces required for the aforementioned communication. The component control unit layer 206 may serve as a point of control of an application, and may also control a dataflow through the monolithic multimedia component 214. The multimedia framework 200 may identify roles for the monolithic multimedia component 214 through the specific interface 216.

In one or more embodiments, the multimedia framework 200 may avoid the need for pins by transmitting commands from the application to a tunnel 218 of a multimedia stack 220 interfaced with the monolithic multimedia component 214. In one or more embodiments, the multimedia stack 220 may include a first block 208 to parse an input, one or more of a second block 210 to transform the output of the first block 208, and a third block 212 to place the resulting data of the second block 210 on a rendering device. In one or more embodiments, the output of one block of the multimedia stack 220 may be fed as an input to the next block downstream through the tunnel 218.

In one or more embodiments, when the application at the framework application layer 202 level queries the component control unit layer 206 for the specific interface 216, the specific interface 216 may pass a pointer thereof to signify a role required by the application of the multimedia framework 200 matching the role identified by the multimedia framework 200 for the monolithic multimedia component 214. In one or more embodiments, commands from the application (e.g., seek, fast-forward, rewind etc.) may then be transmitted from the application to the tunnel 218 of the multimedia stack 220 to enable requisite functions to be performed with proper notification. This may cause the application to be unaware of the underlying component architecture. Specifically, even though the tasks of a source component 108, transform component 110, and renderer 112 of FIG. 1 are performed by the same monolithic multimedia component 214 utilizing the tunnel 218 of the multimedia stack 220, the application may see all source component, transform component, and renderer related interfaces that indicate the functional presence of a source component, transform component, and renderer, akin to FIG. 1.

For example, the multimedia framework 200 may include an audio-related interface that is responsible to change audio-balance. This implies that the audio-related interface may have to be implemented by a renderer. In the multimedia framework 200 of FIG. 2, whenever the audio-related interface is queried by the application, the interface may pass a pointer thereof to the application. The application may see the renderer related interface that indicates the functional presence of a renderer, although internally only a single monolithic multimedia component 214 may be present.

Figure 3:
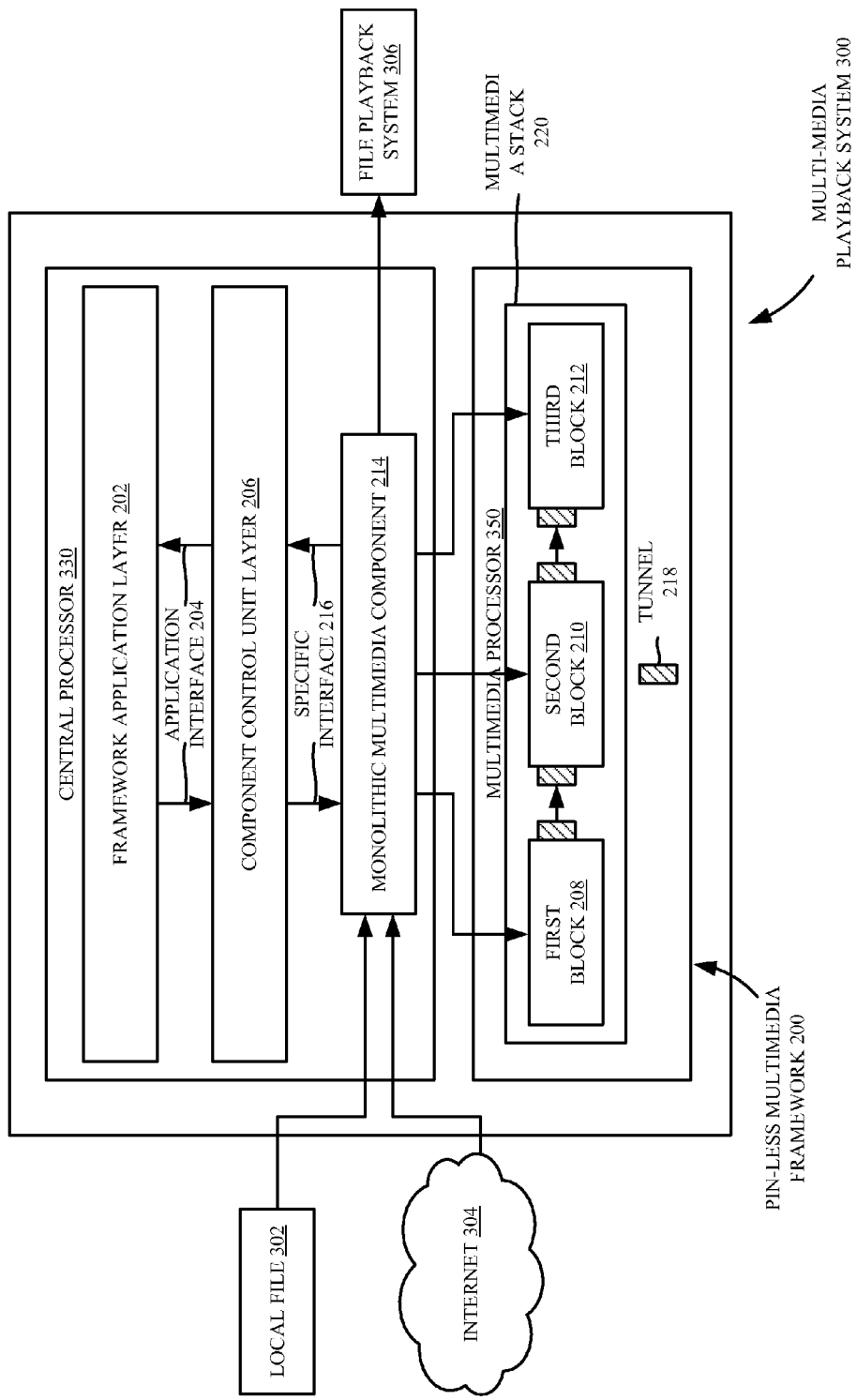
FIG. 3 is a schematic view of a multimedia processing system using the multimedia framework of FIG. 2, in accordance with one or more embodiments.

FIG. 3 is a schematic view of a multimedia processing system 300 using the multimedia framework 200 of FIG. 2, in accordance with one or more embodiments. In one or more embodiments, the multimedia framework 200 in the multimedia processing system 300 may communicate with a local file 302 through the monolithic multimedia component 214. The local file 302 may be an audio file, a video file or an audio/video (A/V) file that serves as the input. In one or more embodiments, the multimedia framework 200 may communicate with a global network of interconnected computers (e.g., Internet 304) through the monolithic multimedia component 214. The input to the monolithic multimedia component 214 may then be a multimedia file stream or a Uniform Resource Locator (URL) including a multimedia file.

The input to the monolithic multimedia component 214 may be processed by the multimedia framework 200, and the processed multimedia data may be played back on the file playback system 306. The file playback system 306 may be a media player or a device capable of playing a media content. In one or more embodiments, the file playback system 306 may render a multimedia stream or a URL including a multimedia file for download on a computer or a mobile device. In one or more embodiments, a capability of capturing multimedia prior to creation of an input file may be provided to the multimedia framework 200. In one embodiment, the capture may be accomplished using a web camera or a video camera. In one or more embodiments, the multimedia framework 200 may be provided with the capability of performing a multimedia file format conversion to convenience compatibility in a plurality of multimedia devices. In one embodiment, for example, a high definition (HD) file may be converted to a 3 gp file to convenience compatibility on a mobile device.

In one or more embodiments, the multimedia stack 220 may be part of a multimedia processor 350 that operates at a frequency (e.g., 150 MHz) lower than the frequency (e.g., 650 MHz) of a central processor 330 that includes the framework application layer 202, the component control unit layer 206, and the monolithic multimedia component 214. The multimedia stack 220 is shown as being part of the multimedia processor 350 interfaced with the monolithic multimedia component 214.

In one or more embodiments, as most tasks may be off-loaded to the multimedia processor 350, the activity of the central processor 330 may be restricted to a requisite parsing. In one or more embodiments, the aforementioned restriction of the activity of the central processor 330 may allow for ultra-low power multimedia playback, thereby resulting in power savings. In one or more embodiments, the lack of need for a pin-based architecture in the multimedia framework 200 of the multimedia processing system 300 of FIG. 3 may provide for memory and resource savings.

In one or more embodiments, a single monolithic multimedia component 214 serving as a parser, decoder, and render may reduce the number of components required to be loaded in memory for playback purposes. In one embodiment, the multimedia processor 350 may be part of a System-on-a-Chip (SoC). In one or more embodiments, a performance of the multimedia processor 350 may be improved by the use of multimedia accelerator modules. In one embodiment, the multimedia processing system 300 may be a mobile processor used in mobile phones. The central processor 330 may then be a Central Processing Unit (CPU) of the mobile processor. The CPU, which may be the maximum power consuming element of the multimedia processing system 300, may go into a "sleep" mode, "waking" up only to do the requisite parsing. In one or more embodiments, the multimedia framework 200 may have exclusive compatibility with particular implementations of hardware.

Figure 4:
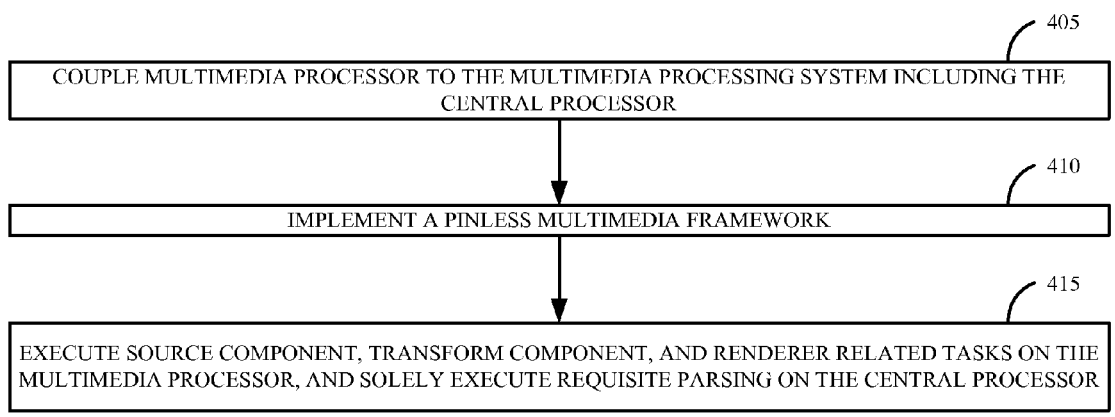
FIG. 4 is a process flow diagram that details the operations involved in a method of multimedia processing that offers power savings, in accordance with one or more embodiments.

FIG. 4 is a process flow diagram that details the operations involved in a method of multimedia processing that offers power savings, in accordance with one or more embodiments. In operation 405, a multimedia processor 350 may be connected to the multimedia processing system 300 including the central processor 330 of FIG. 3. In operation 410, a pin-less multimedia frame work 200 of FIG. 2 may be implemented. In operation 415, the tasks related to the source component 108, the transform component 110, and the renderer 112 of FIG. 1 may be executed on the multimedia processor 350 including the multimedia stack 220. The requisite parsing may solely be executed on the central processor 330 to result in power savings. In one embodiment, implementing the multimedia framework 200 in the multimedia processing system 300 may provide for an ultra-low power multimedia playback. In one or more embodiments, power savings may be decreased ten-fold compared to a multimedia processing system including a pin-based multimedia framework 100 implementation. In one example embodiment, the multimedia framework 200 may provide for 100 hours of audio playback using a 900 mA battery.

Figure 5:
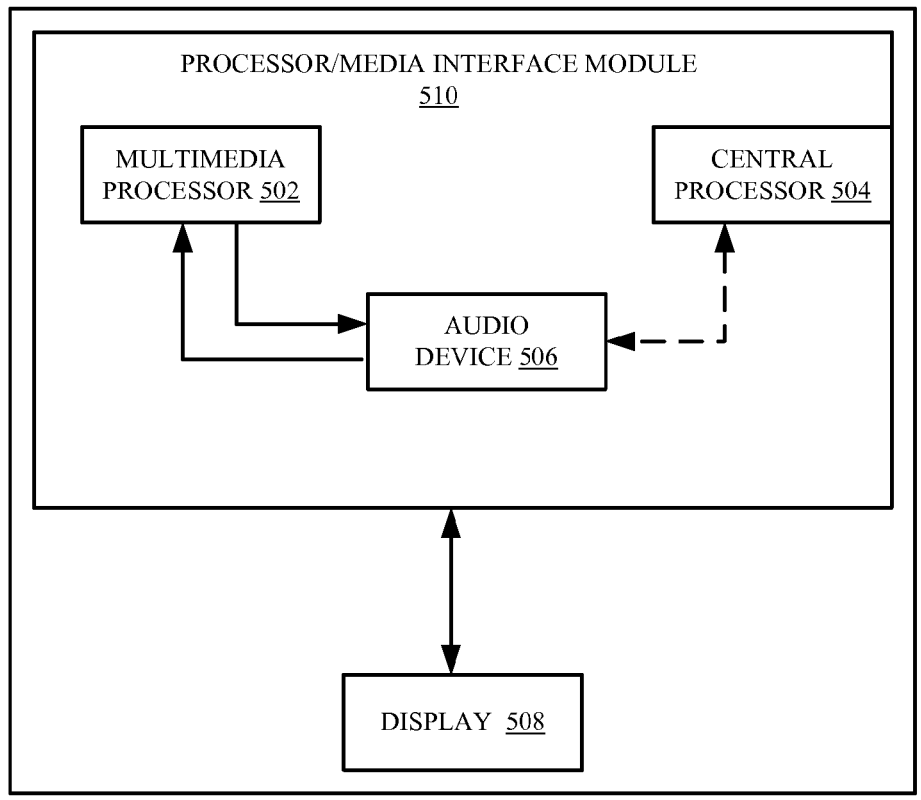
FIG. 5 is a mobile device including a multimedia framework implementation, in accordance with one or more embodiments.

FIG. 5 shows a mobile device 500 including a multimedia framework implementation, in accordance with one or more embodiments. In one or more embodiments, the mobile device 500 may include a processor/media interface module 510 that, in turn, may include a multimedia processor 502 to which most multimedia input, processing, and playback related tasks are off-loaded to, and a central processor 504 on which only requisite parsing is executed. In one or more embodiments, the multimedia processor 502 may be interfaced with an audio device 506 that, in turn, may be interfaced with a display 508 to cause an output video to be displayed with audio.

Although the present embodiments have been described with reference to specific example embodiments, it will be evident that various modifications and changes may be made to these embodiments without departing from the broader spirit and scope of the various embodiments. For example, the multimedia processing system 300 of FIG. 3 and the mobile device 500 of FIG. 5 may involve structural modifications that are well within the scope of the various embodiments. Also, for example, the various devices and modules described herein may be enabled and operated using hardware circuitry (e.g., CMOS based logic circuitry), firmware, software or any combination of hardware, firmware, and software. For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of multimedia processing, the method comprising:
   providing a multimedia processor operating at a frequency lower than that of a central processor of a multimedia processing system;
   implementing a multimedia framework in the multimedia processing system;
   utilizing the multimedia framework to execute, on the multimedia processor, at least one of:
      reading an input,
      transforming a data based on the reading of the input, and
      placing an output based on the transforming of the data on a rendering device;
   providing a multimedia stack in association with the multimedia processor, the multimedia stack comprising at least one of:
      a first block to parse the input,
      at least one second block to transform a first block output data of the first block, and
      a third block to place a resulting data of the at least one second block on the rendering device;
   providing a monolithic multimedia component including a specific interface provided by the multimedia framework, the specific interface signifying roles identified by the multimedia framework for the monolithic multimedia component;
   providing a component control unit layer, serving as a point of control of an application, to control a data flow through the monolithic multimedia component
   supporting necessary interfaces required to communicate between the application and the component control unit layer;
   signifying a role required by the application matching a role identified by the multimedia framework for the monolithic multimedia component by the specific interface passing a pointer thereof when the component control unit layer is queried by the application for the specific interface; and
   reducing power dissipated in the multimedia processing system by solely executing a requisite parsing on the central processor of the multimedia processing system and allowing the central processor to go into a sleep mode thereof otherwise.

2. The method of claim 1, further comprising:
   transmitting a command from the application to a tunnel of the multimedia stack interfaced with the monolithic multimedia component to ensure that the same monolithic multimedia component serves as at least one of:
      a source component to read and to parse an input,
      at least one transform component to transform an output data of the source component, and
      a renderer to place an output of the at least one transform component on the rendering device; and
   ensuring that the application is unaware of the same monolithic multimedia component serving as at least one of the source component, the at least one transform component, and the renderer.

3. The method of claim 1, comprising providing one of:
   an audio file,
   a video file,
   an audio/video (A/V) file,
   a multimedia file stream, and
   a Uniform Resource Locator (URL) including a multimedia file as the input.

4. The method of claim 3, further comprising providing to the multimedia framework a capability to a capture a multimedia prior to creation of the input file comprising the multimedia.

5. The method of claim 3, comprising providing to the multimedia framework a capability of performing a multimedia file format conversion to convenience compatibility in a plurality of multimedia devices.

6. The method of claim 4, wherein providing the multimedia capturing capability involves multimedia capturing capability using one of a web camera and a video camera.

7. The method of claim 1, further comprising improving a performance of the multimedia processor through a use of multimedia accelerator modules.

8. A multimedia processing system comprising:
   a multimedia processor operating at a lower frequency;
   a central processor operating at a frequency higher than that of the multimedia processor; and
   a multimedia framework,
   wherein the multimedia framework is utilized to execute, on the multimedia processor, at least one of:
      reading an input,
      transforming a data based on the reading of the input, and
      placing an output based on the transforming of the data on a rendering device,
   wherein the multimedia processor executes a multimedia stack comprising at least one of:
      a first block to parse the input,
      at least one second block to transform a first block output data of the first block, and
      a third block to place a resulting data of the at least one second block on the rendering device,
   wherein the multimedia framework comprises a monolithic multimedia component including a specific interface that is configured to signify roles identified by the multimedia framework for the monolithic multimedia component,
   wherein the multimedia framework comprises a component control unit layer serving as a point of control of an application to control a data flow through the monolithic multimedia component,
   wherein the multimedia framework supports necessary interfaces required to communicate between the application and the component control layer,
   wherein the specific interface passes a pointer thereof when the component control unit layer is queried by the application for the specific interface to signify a role required by the application matching a role identified by the multimedia framework for the monolithic multimedia component, and
   wherein solely a requisite parsing is executed on the central processor, which is allowed to go into a sleep mode thereof otherwise.

9. The multimedia processing system of claim 8, wherein the multimedia processor operating at the lower frequency is part of a System-on-a-Chip (SoC).

10. The multimedia processing system of claim 8, wherein a performance of the multimedia processor is improved through a use of multimedia accelerator modules.

11. The multimedia processing system of claim 8, wherein the multimedia processing system is a mobile processor used in mobile phones.

12. The multimedia processing system of claim 8, wherein the multimedia processing system is capable of capturing a multimedia prior to creation of an input file comprising the multimedia.

\* \* \* \* \*